United States Patent [19]
Trippett et al.

[11] Patent Number: 6,130,643
[45] Date of Patent: Oct. 10, 2000

[54] ANTENNA NULLING SYSTEM FOR SUPPRESSING JAMMER SIGNALS

[75] Inventors: John M. Trippett, Torrance; Robert E. Vaughan, Redondo Beach, both of Calif.

[73] Assignee: TRW Inc., Redondo Beach, Calif.

[21] Appl. No.: 09/291,713

[22] Filed: Apr. 14, 1999

[51] Int. Cl.[7] .................................................. G01S 3/16
[52] U.S. Cl. ............................................................ 342/380
[58] Field of Search ...................................... 342/378, 380, 342/383; 455/278.1

[56] References Cited

U.S. PATENT DOCUMENTS

| | | | |
|---|---|---|---|
| 4,278,978 | 7/1981 | Easterling et al. | 342/380 |
| 4,635,063 | 1/1987 | Chang et al. | 342/380 |
| 5,175,558 | 12/1992 | DuPree. | |
| 5,493,307 | 2/1996 | Tsujimoto | 342/380 |

*Primary Examiner*—Gregory C. Issing
*Attorney, Agent, or Firm*—Michael S. Yatsko

[57] ABSTRACT

An antenna nulling system (28) for nulling a jamming signal having a multibeam antenna (48), a correlator (72), and antenna pattern calculator (94), a sequential updater (90) and a beamformer (70) is provided. The multibeam antenna (48) includes a plurality of antenna elements (50) and is operable to receive the plurality of signals. The correlator (72) is operable to receive at least one sample signal from one of the antenna elements (50) and a composite signal from the plurality of antenna elements (50). The correlator (72) determines a cross-correlation of the sample signal and the composite signal. The antenna pattern calculator (94) calculates a difference in pattern magnitude of an adapted antenna pattern and a quiescent antenna pattern of the multibeam antenna (48). The sequential updater (90) sequentially calculates a new weight for each of the antenna elements (50) based upon an existing weight of each antenna element (50), the cross-correlation and the difference in pattern magnitude. The beamformer (70) is in communication with the multibeam antenna (48) and the sequential updater (90) to combine a new weight for each of the antenna elements (50) with the plurality of signals received from the multibeam antenna (48) to null the jamming signal.

15 Claims, 5 Drawing Sheets

ANTENNA NULLING SYSTEM FOR SUPPRESSING JAMMER SIGNALS

BACKGROUND OF THE INVENTION

1. Field of the Invention

This invention relates generally to a communications system and, more particularly, to an improved antenna nulling system for suppressing jammer signals.

2. Discussion of the Related Art

Various types of adaptive antenna control systems have been developed to counteract jamming signals. In general, adaptive antenna control systems respond to a jamming signal by forming a null in the antenna pattern, greatly reducing the gain in the direction in which the jamming signal appears.

A number of mathematical techniques known as nulling algorithms have been used to analyze jamming signals and produce effective nulls. These nulling algorithms each have advantages and disadvantages depending on the nulling criteria. For example, most nulling algorithms perform both a jammer suppression function to null the jamming signals and a pattern constraint function to maintain the antenna pattern or coverage area for continued communication in the antenna coverage area.

One such system is disclosed in U.S. Pat. No. 5,175,558 to DuPree, which is hereby incorporated by reference. In DuPree, the nulling algorithm performs jammer suppression using a gradient approach and pattern constraint using a difference in weights approach. The gradient approach utilizes a relatively simple hardware configuration which reduces the overall hardware costs with the tradeoff of having a slower convergence rate for nulling the jamming signals. The difference in weights pattern constraint is also relatively simple and not very computationally tasking, but has a trade off of generally nulling a larger coverage area. This reduced coverage area may eliminate reception of communications from users operating adjacent to where the nulling signals are formed.

Another antenna nulling algorithm is provided by MIT Lincoln Labs which is known as the PACE algorithm (Post Adaptive Coverage Enhancement) or the S-PACE algorithm (Superior Post Adaptive Coverage Enhancement). Each of these antenna nulling algorithms again provide for both jammer suppression and pattern constraint. The jammer suppression is provided using a null space approach, also known as Eigen-vector nulling. This jammer suppression approach provides an increased convergence rate at the cost of increased hardware complexity. The pattern constraint for these nulling algorithms is performed either using a difference in pattern approach (PACE) or a difference in pattern magnitude approach (S-PACE). The difference in pattern or the difference in pattern magnitude approach attempts to maintain the antenna pattern as close to the quiescent antenna pattern or original antenna coverage area, thereby providing sharper nulling in the antenna pattern or coverage area. The trade off in these pattern constraint techniques is that they are more computationally tasking then the difference in weights approach. Therefore, the PACE and S-PACE systems employ both complex jammer suppression and pattern constraint.

What is needed then is an improved antenna nulling system for nulling jamming signals which does not suffer from the above-mentioned disadvantages. This will, in turn, provide an improved antenna nulling system that produces sharp nulls at the antenna jamming signals but does not degrade desired incoming communications signals from multiple users. Such a system will balance the disadvantages of the various nulling algorithms to provide a nulling algorithm that provides superior results with reduced hardware complexity and costs to provide overall improved performance. It is, therefore, an object of the present invention to provide an improved antenna nulling system which utilizes a simpler gradient approach to suppress the jamming signals and a difference in pattern magnitude approach to recover lost antenna signal gain due to suppression of the received jamming signals. The gradient approach will iteratively readjust the magnitude and the angle of received signals from each antenna feed to suppress the overall jammer signal strength. The difference in pattern magnitude approach will increase gain around the removed jamming signal to increase signal strength to users in the area.

SUMMARY OF THE INVENTION

In accordance with the teachings of the present invention, an antenna nulling system for nulling a jamming signal is provided. The antenna nulling system uses a gradient approach to suppress the jamming signal and a difference in pattern magnitude approach to recover lost antenna signal gain due to suppression of the received jamming signal.

In one preferred embodiment, an antenna nulling system for nulling a jamming signal includes a multibeam antenna having a plurality of antenna elements. The multibeam antenna is operable to receive a plurality of signals from the plurality of antenna elements. A correlator receives at least one sample signal from one of the antenna elements and a composite signal from the plurality of antenna elements. The correlator is operable to determine a cross-correlation of the sample signal and the composite signal. An antenna pattern calculator is operable to calculate a difference in pattern magnitude of an adaptive antenna pattern and a quiescent antenna pattern of the multibeam antenna. A sequential updater is operable to sequentially calculate a new weight for each of the antenna elements based upon an existing weight of each antenna element, the cross-correlation and the difference in pattern magnitude. A beamformer is in communication with the multibeam antenna and the sequential updater and is operable to combine the new weight for each of the antenna elements with the plurality of signals received from the multibeam antenna to null the jamming signal.

Use of the present invention provides an antenna nulling system for nulling a jamming sign to reduce hardware complexity and approve overall performance over existing systems. As a result, the aforementioned disadvantages associated with the current antenna nulling systems have been substantially reduced or eliminated.

BRIEF DESCRIPTION OF THE DRAWINGS

The various advantages of the present invention will become apparent to those skilled in the art after reading the following specification by reference to the drawings in which.

DETAILED DESCRIPTION OF THE PREFERRED EMBODIMENTS

The following description of the preferred embodiment concerning an improved antenna nulling system for nulling jamming signals in a satellite communications system is merely exemplary in nature and is not intended to limit the invention or this application or uses. Moreover, while the invention is described in detail below with respect to a satellite communications system, it will be appreciated by those skilled in the art of the present invention may be utilized with other types of communications systems as well.

Figure 1:
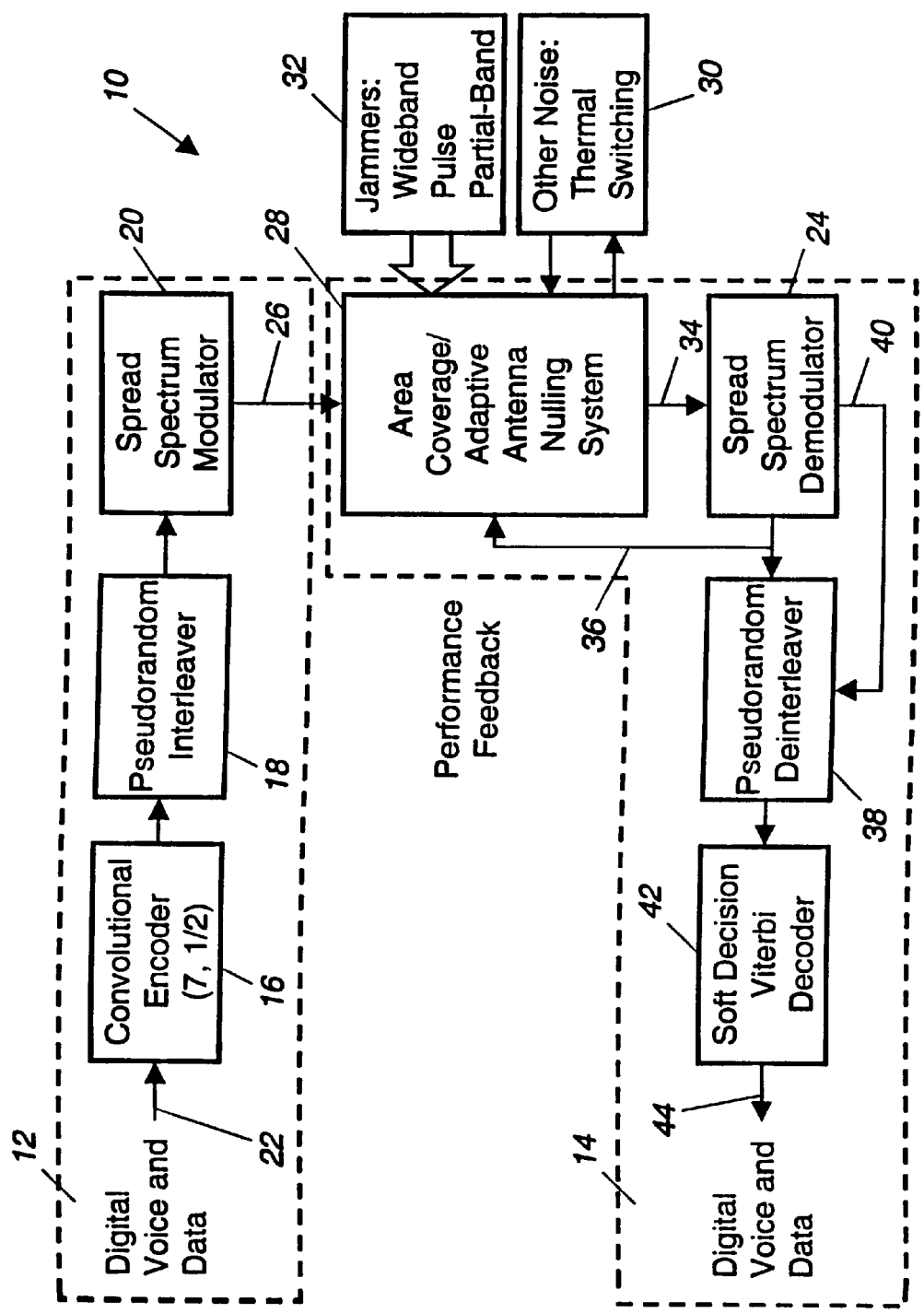
FIG. 1 is a schematic block diagram of the overall communications link in accordance with the teachings of the preferred embodiment of the present invention.

Referring to FIG. 1, a communication link 10 employing the improved nulling antenna system of the present invention is shown. The communication link 10 is somewhat similar to that shown in U.S. Pat. No. 5,175,558, which is hereby incorporated by reference. The communication link 10 includes a terrestrial or satellite terminal 12 and a communications satellite 14. The terrestrial terminal 12 includes a convolutional encoder 16, a pseudo-random interleaver 18, and a spread spectrum modulator 20. Digital voice and data 22 to be transmitted is processed by the convolutional encoder 16. For example, digital voice and data 22 may comprise signals transmitted by the terminal 12 in the microwave frequency range or any other appropriate frequency range. The convolutional encoder 16 introduces known redundancy among symbols or bits within a few constraint length spacings. The pseudo-random interleaver 18 spreads the related symbols or bits much farther apart pseudo-randomly. Finally, the spread spectrum modulator 20 spreads the data over a channel bandwidth many times greater than the data bandwidth. This results in a spreading of the jammer power across the channel bandwidth, effectively reducing the noise density. Later by knowing the spread spectrum code, a spread spectrum demodulator 24 can despread the data channel back into the data bandwidth. This modulation/demodulation operation results in a significant signal-to-noise ratio improvement.

After processing by the convolutional encoder 16, pseudo-random interleaver 18, and spread spectrum modulator 20, within the terminal 12, the coded signals 26 are transmitted and eventually received by an area coverage adaptive antenna nulling system 28 in the communications satellite 14. The antenna nulling system 28 may also receive other signals such as thermal and switching noise 30 and may be subject to jamming signals 32 that can comprise wide band, pulse or partial band jamming. The task of the antenna nulling system 28 is to combine the correlated signals at a beamformer in such a way as to null the jamming signal, effectively removing it from the antenna nulling system output 34.

After processing by the spread spectrum demodulator 24, a performance feedback 36 is fedback to the antenna nulling system 28 to allow correlation measurements for the adaptive process and assure that everything is time aligned. A pseudo-random deinterleaver 38 restores the spacing and sequence of the coded symbols or bits which were previously interleaved. In this regard, any remaining jammer bursts are now spread pseudo-randomly so that they appear as random errors within the convolutional decoder constraint length. Jammer state or side information (erasures) 40 is transmitted from the spread spectrum demodulator 24 to the pseudo-random deinterleaver 38 for the purpose of identifying those symbols or bits which have been jammed and are not considered reliable. Finally, a soft decision Viterbi decoder 42 will use the reliability information to optimally correct errors and erasures. The resulting digital voice and data signal 44 is subsequently available, relatively free of jamming interference, with a substantially reduced probability of bit error (BER). This system may also be implemented without the benefit of jammer state information, with minor degradations in performance. Similarly, hard decision Viterbi decoding may be substituted for soft decision decoding.

Figure 2:
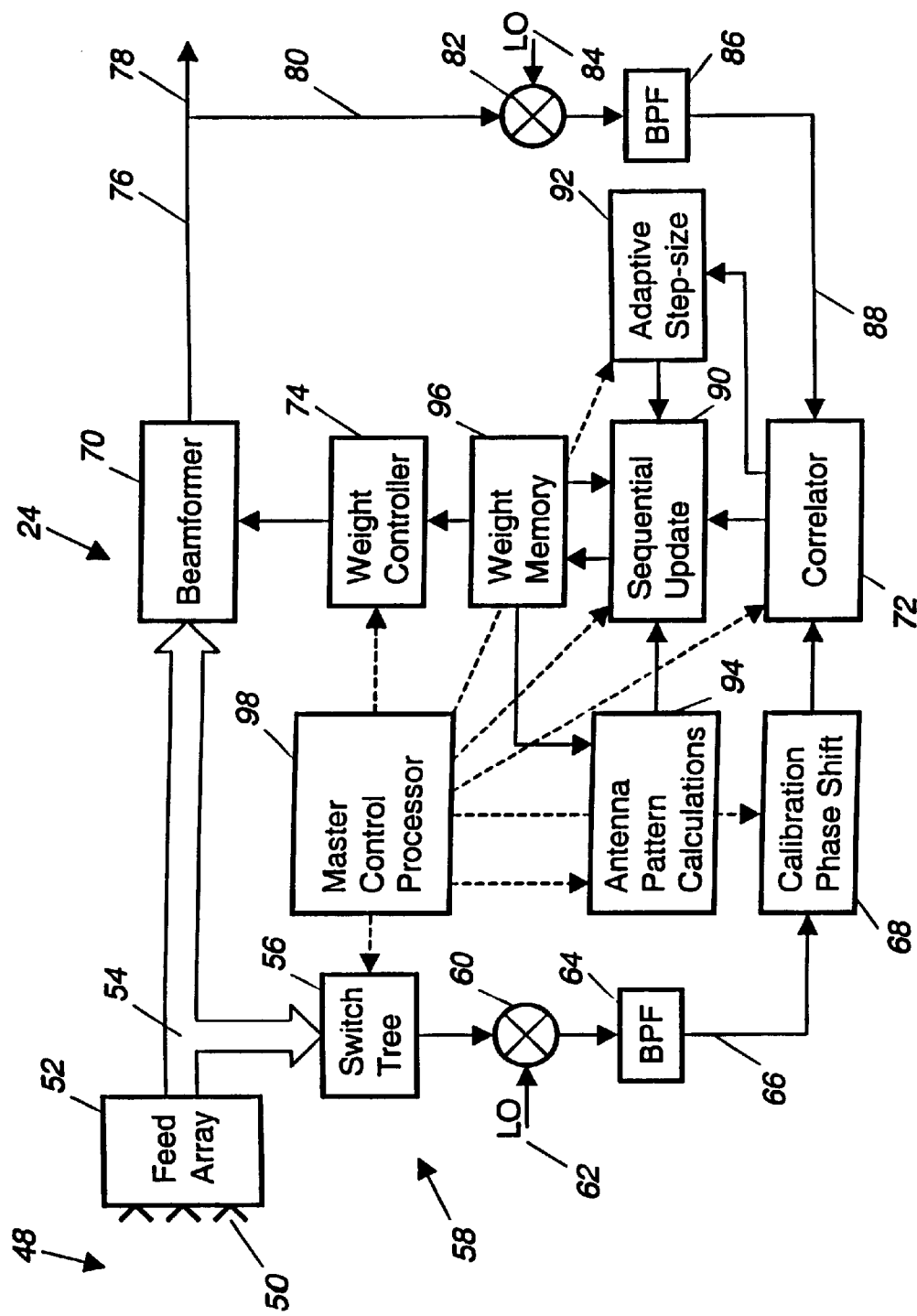
FIG. 2 is a schematic block diagram of the improved antenna nulling system in accordance with the teachings of the preferred embodiment of the present invention.

Turning now to FIG. 2, the improved antenna nulling system 28 is shown in further detail. The coded transmitted signal 26 is received by a multibeam antenna 48 which may comprise a conventional multibeam antenna consisting of a dish or other reflective element which forms an image of the source on an array of antenna elements or feedhorns 50 laid out in a particular pattern. The feedhorns 50 are fed by a feed array 52 consisting of parallel paths of waveguides which are directed along parallel path 54 by means of directional couplers to a switch tree 56. For example, there is preferably about seven (7) individual feedhorns 50 in the feed array 52, of which three (3) or four (4) may capture the jamming signal. As a result, only these three (3) or four (4) beams will be actively involved in forming a null in subsequent processing. The other beams will not be involved and will contribute to an area coverage pattern that will provide network service to a theater of operations. Should a phased array multibeam antenna be used, many more antenna elements will generally be employed.

Overall, the approach of nulling jamming signals is to determine how much of a jamming signal is present in each of the individual antenna elements 50 or paths of the feed array 52 and canceling, by appropriate gain weighting and phasing of the jamming signal. The result is that at a specific angle that the jamming signal happens to be at relative to the antenna 48, the antenna 48 produces the corrective amplitude and phase of the various antenna elements 50 or feed array paths with the proper weight set in a beamformer so that the jamming signal can't get through to the output at that angle. In this improved antenna nulling system 28, the gain weighting is performed based upon the overall antenna pattern, further discussed herein, as opposed to simply adjusting the weights based upon monitoring the existing weights at the beamformer as is performed in U.S. Pat. No. 5,175,558.

The switch tree 56 is essentially a multiplexed switch that switches between paths 54 of the feed array 52 such that only sample signals received from a single element or horn 50 is dealt with separately at a given time along the feed or sample path 58. The switch tree output is fed to a mixer 60 which mixes this single feed with a local oscillator 62 to shift the frequency from an RF signal to an IF signal, as well as despread the signal. It should be noted that the despreading is accomplished by having the local oscillator 62 providing only the same frequency shifts that are used in the spread spectrum code used by the spread spectrum modulator 20 and the spread spectrum demodulator 24. (The local oscillator 62 is not a constant frequency but is either a frequency hopped replica of the original frequency hopping code, or it is a pseudo-noise (PN) modulated local oscillator using the same PN code as would have been used in the direct sequence modulation for the desired signal.) The overall result is that the desired signals compress from a very large channel bandwidth back to its essential data bandwidth that is very narrow and that is then eliminated by the band pass filter (BPF) 64. The band pass filter 64 attenuates frequencies in the original data communication band. Therefore, the band pass filter 64 eliminates the desired signal from this feed path 58 so that the output 66 is everything that corresponds to unknown signals, such as jammer signals or noise. In other words, the band pass filter 64 strips off all the user communication signals and only leaves the jammer signals or noise associated with that particular antenna element 50 of the feed array 52. It should further be noted that the switch tree 56 may be eliminated should multiple parallel hardware paths 58 be used.

The calibration phase shift 68 is a phase shifter used to control the phase error or phase bias along the feed path 58 so that for a zero phase, a zero phase measurement results. Accordingly, the calibration phase shift 68 is a control for a calibration procedure. With the calibration phase shift 68 being similar to the components used in the beamformer 70, the calibration phase shift 68 also has similar temperature drift characteristics and may therefore, also compensate the correlation loop or feed path 58 against phase errors due to temperature changes. The output from the calibration phase shift 68 is applied to a correlator 72, further discussed herein.

The beamformer 70 is a well known apparatus that controls the complex gain (i.e., magnitude and phase) of the individual paths 54 by combining coherently the signals from all of the various paths. In other words, the beamformer 70 performs an inner product between the vector of the voltages at the input to the beamformer 70 and the weight vector received by a weight controller 74. In this regard, the beamformer 70 essentially weights each antenna element 50 of the feed array 52 and sums this with the signals received from the antenna 48 to form a single composite beam output or signal 76. This composite output 76 is applied to the spread spectrum demodulator 24, pseudo-random deinterleaver 38 and decoder 42 along path 78. A composite or sum feedback path 80 is also routed from the output 76. Ideally, after convergence, output 76 of the beamformer 70 should represent the communication signals without any jamming signals present.

The composite signal from composite feedback path 80 is applied to a mixer 82 which mixes this composite signal with a local oscillator 84. The local oscillator 84 is again adjusted in frequency such that the output from the mixer 82 is the desired IF signal similar to the local oscillator 62 and mixer 60. A band pass filter (BPF) 86 strips off everything from this IF signal so that the output 88 from the band pass filter 86 is everything that corresponds to unknown signals. Here again, the output of the band pass filter 86 are all the signals which do not synchronize with the frequency hopping code and therefore might represent interference, undesired jamming or noise signals. This output 88 is also applied to the correlator 72.

The correlator 72 performs two functions. First, the correlator 72 takes the two input signals (one from the calibration phase shift 68 (sample signal) and one from the band pass filter 86 (composite signal)) and multiplies these inputs together to provide a cross-correlation $\gamma_i(n)$ between the sample path 58 and the sum path 80. This correlation essentially identifies what is common between the two paths and this information is used to null the jamming signals by minimizing output jammer power using the gradient approach. Secondly, the correlator 72 measures the auto-correlation or power of the sample path 58 which information is passed to the adaptive step-size block 92. The sequential update unit 90, further shown in detail in FIG. 4, receives the correlation information $\gamma_i(n)$ from the correlator 72, antenna pattern calculation information $\beta_i(n)$ from an antenna pattern calculation block or calculator 94, step-size information $\mu_i(n)$ from the adaptive step-size block 92 and previous weight memory information $w_i(n)$ from a weight memory 96. With this information, the sequential update 90 sequentially calculates a new complex weight $w_i(n+1)$ for each antenna element 50 and forwards the new weights to the weight memory 96. The $\beta_i(n)$ function from the antenna pattern calculation block 94 tries to keep the current antenna pattern as close to the quiescent antenna pattern as possible, while the $\gamma_i(n)$ function from the correlator 72 wants to null the jamming signal. The sequential update unit 90 balances these two inputs or interests to null the jamming signal, as well as maintain appropriate communications with the users in the theater of interest. The new weight memory provided by the sequential update 90 is stored in the weight memory 96 and subsequently used by the weight controller 74 to control the weighting in the beamformer 70.

Figure 3:
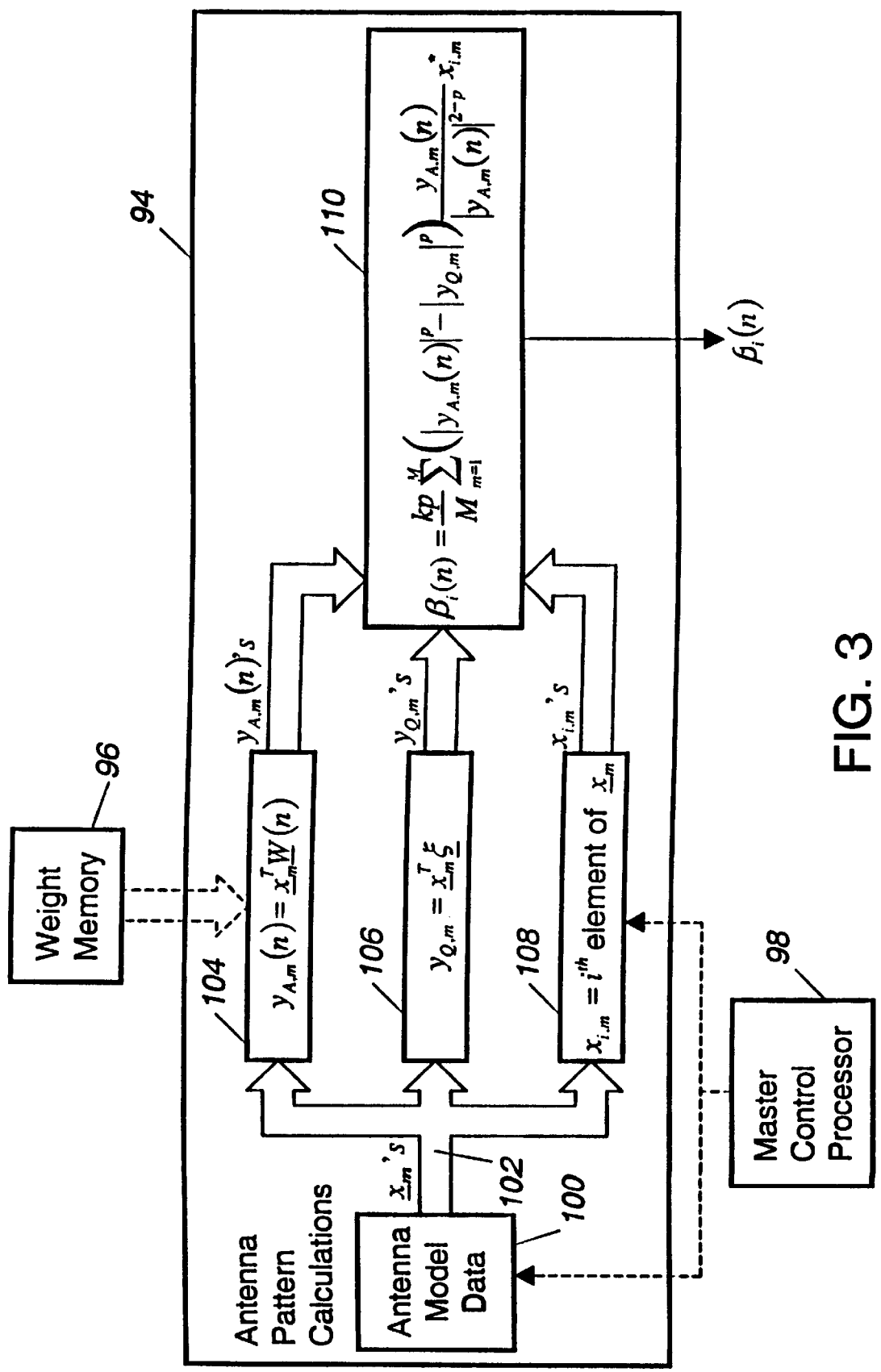
FIG. 3 is a detailed schematic block diagram of the antenna pattern calculator shown in FIG. 2.

The antenna pattern calculation block 94, further shown in detail in FIG. 3, measures the difference in pattern magnitude and phase between the adapted antenna pattern ($y_A(\theta,\phi,\underline{w})$) and the quiescent antenna pattern ($y_Q(\theta,\phi)$) of the multibeam antenna 48. The adapted antenna pattern is the pattern obtained from the current weighting of the feed array 52, via the beamformer 70. The quiescent antenna pattern is the original pattern used to cover the particular theater of interest. The adaptive step-size 92 weights the $\beta_i(n)$ and $\gamma_i(n)$ functions to control the incremental steps that the current weights will be changed by, similar to that used in U.S. Pat. No. 5,175,558. This controls how much to change the weight which controls how fast and how long a null will be formed for. The weight memory 96 stores all of the weights for each antenna element 50 in the feed array 52 and provides this information to the antenna pattern calculation block 94 and the sequential update block 90 for subsequent use in determining new weight settings for each antenna element 50.

A master control processor 98 is connected to all of the main components of the antenna nulling system 28. Depending on the type of hardware implementation, the master controller processor 98 may perform some or all the functions of these components. In the preferred embodiment, the master controller processor 98 comprises a pipeline processor consisting of multiple instruction, multiple data (MIMD) architecture.

Turning to FIG. 3, a more detailed schematic block diagram of the antenna pattern calculation block or calculator 94 is shown. The antenna pattern calculation block 94 receives the current adapted weight information from the weight memory 96 for each of the antenna elements 50. The control and calculation of the antenna pattern calculation block 94 are performed, via the master control processor 98. The antenna pattern calculation block 94 includes antenna model data $x_m$'s 100 which is feed model data. In other words, the antenna model or feed model data 100 models the output magnitude and phase of each of the antenna elements 50 along path 54 if a signal is in the Mth position or point. This data is passed along parallel paths 102 and fed to an adapted antenna pattern block 104, a quiescent antenna pattern block 106, and a feed model selector block 108.

The adapted antenna pattern block 104 calculates the adaptive antenna pattern at the Mth direction or point for all M's. The output $y_{A,m}(n)$'s from the adaptive antenna pattern block 104 is the adapted pattern at a point m at time n. In other words, block 104 determines the adapted pattern for each of the points m at a time n. The quiescent antenna pattern block 106 performs a similar function as the adapted antenna pattern block 104, except that each $\underline{x}$ is multiplied by the quiescent weights $\xi$ versus the current weights w(n), as with adapted antenna pattern block 104. The output $y_{a,m}$'s from quiescent antenna pattern block 106 is the quiescent antenna pattern at points m. It should be noted that this output is not a function of time (n) since we are dealing with the quiescent weights $\xi$ versus the current weights w(n) which change with time. The feed model selector block 108 determines and controls which weights are being determining for which given antenna element 50. This block 108 provides an output of $x_{i,m}$'s. The master control processor 98 controls which i or antenna element 50 you are looking at and informs the antenna model data block 100 as to which antenna element 50 you are at. The master control processor 98 also determines the number of m points to be used for the calculation.

With this information, a difference in pattern magnitude $\beta_i(n)$ 110 is calculated, further discussed herein. Essentially the difference in pattern magnitude 110 provides a summation output from m=1 to M for all m points and calculates the difference in magnitude raised to the P power of $y_A$ and $y_Q$. This approach is an improvement over the difference between weights approach because it provides for sharper nulling, thereby providing increased percent coverage area (PCA) to receive communication signals from more users while effectively nulling the jamming signals.

Figure 4:
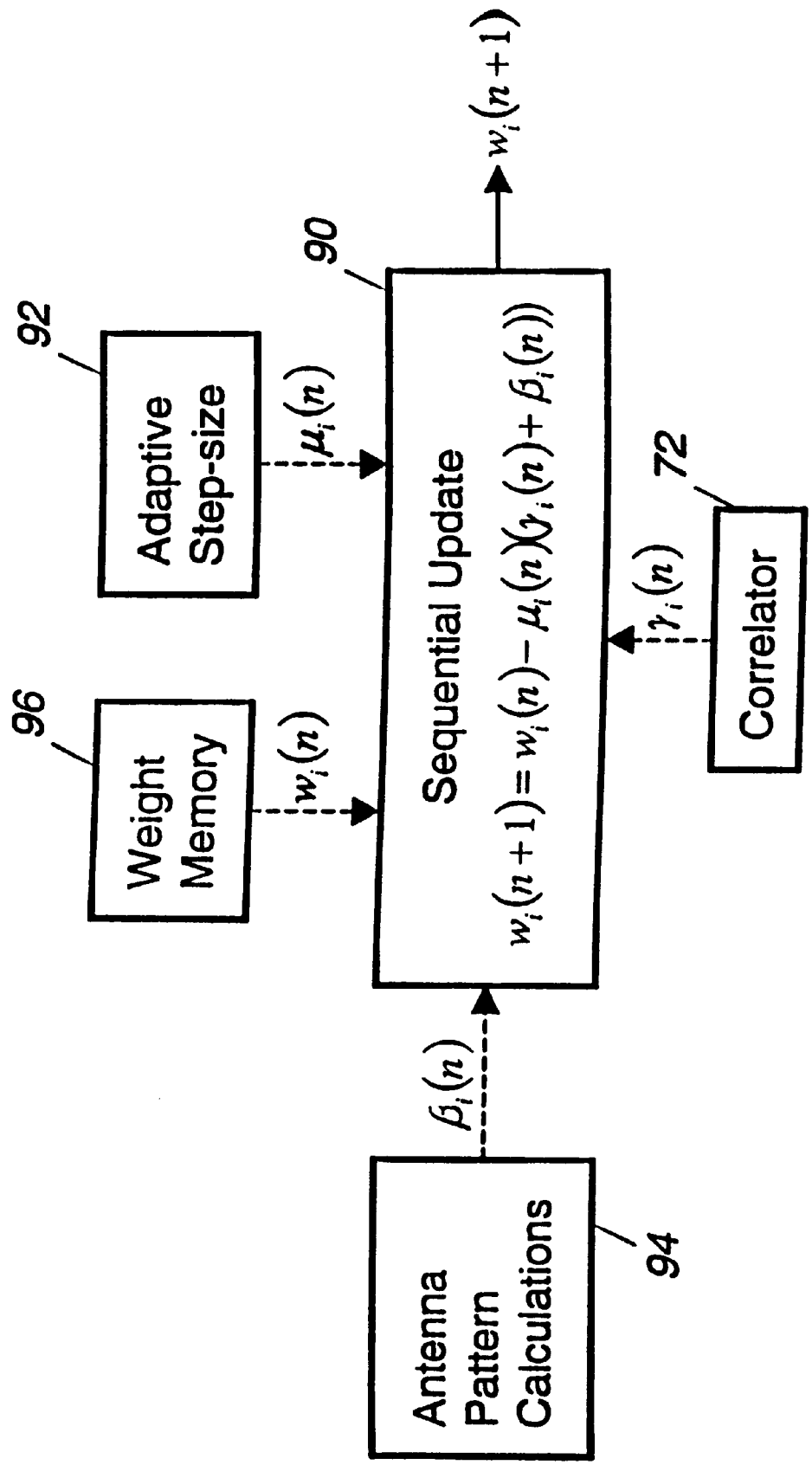
FIG. 4 is a detailed schematic block diagram of the sequential update shown in FIG. 2.

Turning to FIG. 4, a more detailed block diagram of the sequential update 90 along with its inputs are shown. Here again, the sequential update 90 receives the correlation information $\gamma_i(n)$ from the correlator 72, the difference in pattern magnitude information $\beta_i(n)$ from the antenna pattern calculation block 94, the current weight memory $w_i(n)$ from the weight memory 96 and the adaptive step-size $\mu_i(n)$ from the adaptive step-size 92 to update the current weights $w_i(n)$ with the new weights $w_i(n+1)$. Overall, the sequential update 90 balances the input from the correlator 92 and the input from the antenna pattern calculation block 94 to null the jammer signal while also maintaining as large as antenna pattern coverage area as possible. The weight update equation shown in sequential update block 90 is derived as follows.

We start with the cost function:

$$\epsilon^2 = \underline{w}^H \Phi_n \underline{w} + k \int \int_{106} (|y_A(\theta,\phi,\underline{w})|^P - |y_Q(\theta,\phi)|^P)^2 d\Omega \quad (1)$$

where $\underline{w}$—adapted weights $y_A(\theta,\phi,\underline{w})$—adapted (voltage) pattern $y_Q(\theta,\phi)$—quiescent (voltage) pattern $\Phi_n$—covariance matrix (jammer+noise)

k—nulling parameter (higher k preserves pattern better but won't null as deeply)

p—nulling parameter (different values of p may work better for different applications)

$\Omega$—coverage area

The first part of this cost function, $\underline{w}^H \Phi_n \underline{w}$, is the portion that reduces jammer interference using the gradient approach. The second portion attempts to preserve the quiescent pattern by making the two patterns as close together as possible over the coverage area using the difference in pattern magnitude approach.

First, we define the coverage area to be M discrete points. Then we can replace the double integral with a summation $$\int \int_\Omega (|y_A(\theta,\phi,\underline{w})|^P - |y_Q(\theta,\phi)|^P)^2 d\Omega = \quad (2)$$

$$\frac{1}{M} \sum_{m=1}^{M} (|y_A(\theta_m,\phi_m,\underline{w})|^P - |y_Q(\theta_m,\phi_m)|^P)^2$$

Rewriting and changing the notational dependence on $(\theta,\phi)$:

$$\int \int_\Omega (|y_A(\theta,\phi,\underline{w})|^P - |y_Q(\theta,\phi)|^P)^2 d\Omega = \quad (3)$$

$$\frac{1}{M} \sum_{m=1}^{M} (|y_A(m,\underline{w})|^P - |y_Q(m)|^P)^2$$

Substituting (3) into (1) produces $$\epsilon^2 = \underline{w}^H \Phi_n \underline{w} + \frac{k}{M} \sum_{m=1}^{M} (|y_A(m,\underline{w})|^P - |y_Q(m)|^P)^2 \quad (4)$$

Using the following relationships for $y_A$ and $y_Q$ with (4)

$$y_A(m,\underline{w}) = \underline{x}^T(m)\underline{w} \quad (5)$$

$$y_Q(m) = \underline{x}^T(m)\underline{\xi} \quad (6)$$

We get the cost function in terms of the adapted weights $\underline{w}$, the quiescent weights , and the feed voltage response vector $\underline{x}$.

$$\epsilon^2 = \underline{w}^H \Phi_n \underline{w} + \frac{k}{M} \sum_{m=1}^{M} \left( (\underline{w}^H \underline{x}^*(m)\underline{x}^T(m)\underline{w})^{\frac{p}{2}} - (\underline{\xi}^H \underline{x}^*(m)\underline{x}^T(m)\underline{\xi})^{\frac{p}{2}} \right)^2 \quad (7)$$

If we expand (7) we get $$\epsilon^2 = \underline{w}^H \Phi_n \underline{w} + \frac{k}{M} \sum_{m=1}^{M} \left( (\underline{w}^H \underline{x}^*(m)\underline{x}^T(m)\underline{w})^p - \quad (8)\right.$$

$$2(\underline{\xi}^H \underline{x}^*(m)\underline{x}^T(m)\underline{\xi})^{\frac{p}{2}} (\underline{w}^H \underline{x}^*(m)\underline{x}^T(m)\underline{w})^{\frac{p}{2}} +$$

$$\left. (\underline{\xi}^H \underline{x}^*(m)\underline{x}^T(m)\underline{\xi})^p \right)$$

The well known steepest descent algorithm is of the form:

$$\underline{w}(n+1) = \underline{w}(n) - \frac{1}{2} \mu \nabla_{\underline{w}} \epsilon^2 \quad (9)$$

where $\nabla_{\underline{w}} \epsilon^2$ is the gradient of the cost function, $\epsilon^2$, with respect to the weight vector $\underline{w}$. The step-size, $\mu$, may be either a scalar or a matrix. Taking the gradient of (8) we get $$\nabla_{\underline{w}} \epsilon^2 = 2\Phi_n \underline{w} + \frac{k}{M} \sum_{m=1}^{M} \left( p(\underline{w}^H \underline{x}^*(m)\underline{x}^T(m)\underline{w})^{p-1} (2\underline{x}^*(m)\underline{x}^T(m)\underline{w}) - \quad (10) \right.$$

$$\left. 2(\underline{\xi}^H \underline{x}^*(m)\underline{x}^T(m)\underline{\xi})^{\frac{p}{2}} \left(\frac{p}{2}\right) (\underline{w}^H \underline{x}^*(m)\underline{x}^T(m)\underline{w})^{\frac{p}{2}-1} (2\underline{x}^*(m)\underline{x}^T(m)\underline{w}) \right)$$

Simplifying:

$$\nabla_{\underline{w}}\varepsilon^2 = 2\Phi_n\underline{w} + 2\frac{kp}{M}\sum_{m=1}^{M}\left((\underline{w}^H\underline{x}^*(m)\underline{x}^T(m)\underline{w})^{p-1} - \right. \quad (11)$$

$$\left.(\underline{\xi}^H\underline{x}^*(m)\underline{x}^T(m)\underline{\xi})^{\frac{P}{2}}(\underline{w}^H\underline{x}^*(m)\underline{x}^T(m)\underline{w})^{\frac{P}{2}-1}\right)\underline{x}^*(m)\underline{x}^T(m)\underline{w}$$

Using (5) and (6) we simplify:

$$\nabla_{\underline{w}}\varepsilon^2 = 2\Phi_n\underline{w} + 2\frac{kp}{M}\sum_{m=1}^{M}(|y_A(m,\underline{w})|^{2p-2} - \quad (12)$$

$$|y_Q(m)|^p|y_A(m,\underline{w})|^{p-2})y_A(m,\underline{w})\underline{x}^*(m)$$

$$\nabla_{\underline{w}}\varepsilon^2 = 2\Phi_n\underline{w} + 2\frac{kp}{M}\sum_{m=1}^{M}(|y_A(m,\underline{w})|^p - \quad (13)$$

$$|y_Q(m)|^p)\frac{y_A(m,\underline{w})}{y_A(m,\underline{w})^{2-p}}\underline{x}^*(m)$$

Substituting (13) into (9) we get the update equation $$\underline{w}(n+1) = \underline{w}(n) - \mu\left[\Phi_n\underline{w} + \frac{kp}{M}\sum_{m=1}^{M}(|y_A(m,\underline{w})|^p - \quad (14)\right.$$

$$\left.|y_Q(m)|^p)\frac{y_A(m,\underline{w})}{y_A(m,\underline{w})^{2-p}}\underline{x}^*(m)\right]$$

We assign the following values:

$$\underline{\gamma}(n) = \Phi_n\underline{w} \quad (15)$$

$$\underline{\beta}(n) = \frac{kp}{M}\sum_{m=1}^{M}(|y_A(m,\underline{w})|^p - |y_Q(m)|^p)\frac{y_A(m,\underline{w})}{|y_A(m,\underline{w})|^{2-p}}\underline{x}^*(m) \quad (16)$$

where $\underline{\beta}(n)$ is formed by the antenna model $\underline{x}(m)$'s and the relationships in (5) and (6).

Using (15) and (16), the weight update equation becomes:

$$\underline{w}(n+1) = \underline{w}(n) - \mu(\underline{\gamma}(n) + \underline{\beta}(n)) \quad (17)$$

This can be expressed as a scalar update for the $i^{th}$ weight $$w_i(n+1) = w_i(n) - \mu_i(\gamma_i(n) + \beta_i(n)) \quad (18)$$

where $\gamma_i(n)$ and $\beta_i(n)$ are the ith elements of $\underline{\gamma}(n)$ and $\underline{\beta}(n)$ and represent the outputs of the correlator and antenna model blocks respectively.

Figure 5:
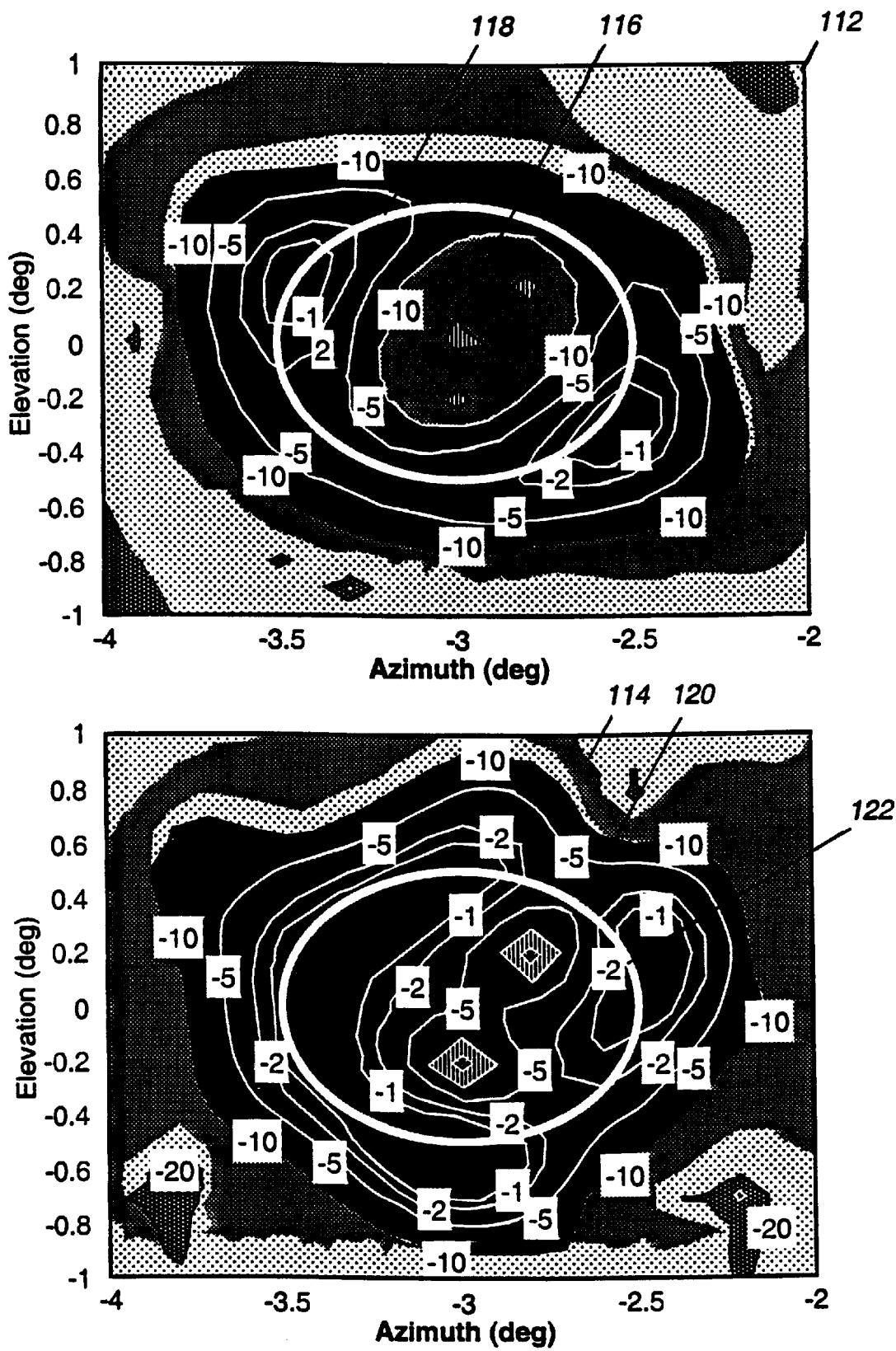
FIG. 5 is a diagram comparing the antenna pattern nulling performance of a prior art nulling algorithm with the performance of the present invention.

Referring to FIG. 5, the performance of the improved antenna nulling system 28 is shown compared to that of U.S. Pat. No. 5,175,558. In this regard, graph 112 shows the performance of U.S. Pat. No. 5,175,558 and graph 114 shows the performance of the improved antenna nulling system 28. It can be readily observed that the weight update equation used by the improved antenna nulling system 28 produces much tighter nulls which improves the percent coverage area. In this example, a 20% to 40% improvement is shown over the existing system. In other words, the area 116 in graph 112 is the nulled portion in coverage region 118 while the regions 120 are the nulled portions in coverage region 122. Here again, the weight update equation utilizes both the gradient approach iteratively to readjust the magnitude and the angle of the received signal from each antenna feed to suppress the overall jammer signal strength and a difference pattern magnitude approach to increase gain around the removed jamming signal to increase signal strength to users in the area as clearly observed here.

The foregoing discussion discloses and describes merely exemplary embodiments of the present invention. One skilled in the art will readily recognize from such discussion, and from the accompanying drawings and claims, that various changes, modifications and variations can be made therein without departing from spirit and scope of the invention as defined in the following claims.

What is claimed is:

1. An antenna nulling system for nulling a jamming signal, said antenna nulling system comprising:

a multibeam antenna having a plurality of antenna elements, said multibeam antenna operable to receive a plurality of signals from said plurality of antenna elements;

a correlator operable to receive at least one sample signal from one of said antenna elements and a composite signal from said plurality of antenna elements, said correlator operable to determine a cross-correlation of said sample signal and said composite signal;

an antenna pattern calculator operable to calculate a difference in pattern magnitude of an adapted antenna pattern and a quiescent antenna pattern of said multibeam antenna;

a sequential updater operable to sequentially calculate a new weight for each of said antenna elements based upon an existing weight of each antenna element, said cross-correlation and said difference in pattern magnitude; and a beamformer in communication with said multibeam antenna and said sequential updater, said beamformer operable to combine said new weight for each of said antenna elements with said plurality of signals received from said multibeam antenna to null said jamming signal.

2. The antenna nulling system as defined in claim 1 further comprising a switch tree in communication with said multibeam antenna, said switch tree operable to switch between paths to each of said plurality of antenna elements.

3. The antenna nulling system as defined in claim 1 further comprising a band pass filter operable to remove communication signals from said at least one sample signal.

4. The antenna nulling system as defined in claim 1 further comprising an adaptive step-sizer in communication with said sequential updater, said adaptive step-sizer operable to control how much said new weight for each antenna element calculated by said sequential updater will be changed by to control how fast a null will be formed.

5. The antenna nulling system as defined in claim 1 further comprising a weight memory operable to store said existing weight of each antenna element and update said existing weight of each antenna element with said new weight for each antenna element upon being calculated by said sequential updater.

6. The antenna nulling system as defined in claim 1 wherein said antenna pattern calculator includes an adapted antenna pattern calculator, a quiescent antenna pattern calculator and a feed model selector.

7. The antenna nulling system as defined in claim 6 wherein said adapted antenna pattern calculator calculates an adapted antenna pattern of said multibeam antenna at a plurality of points, said quiescent antenna pattern calculator calculates a quiescent antenna pattern of said multibeam antenna at a plurality of points, and said feed model selector controls a weight determination for each of said plurality of antenna elements.

8. An antenna nulling system for nulling a jamming signal, said antenna nulling system comprising:

a multibeam antenna having a plurality of antenna elements, said multibeam antenna operable to receive a plurality of signals from said plurality of antenna elements;

a switch tree in communication with said multibeam antenna, said switch tree operable to switch between each of said plurality of antenna elements and receive a sample signal from each of said antenna elements;

a band pass filter in communication with said switch tree, said band pass filter operable to remove communication signals from each of said sample signals;

a correlator operable to receive at least one sample signal from one of said antenna elements and a composite signal from said plurality of antenna elements, said correlator operable to determine a cross-correlation of said sample signal and said composite signal;

an antenna pattern calculator operable to calculate a difference in pattern magnitude of an adapted antenna pattern and a quiescent antenna pattern of said multibeam antenna;

a sequential updater operable to sequentially calculate the new weight for each of said antenna elements based upon an existing weight of each antenna element, said cross-correlation and said difference in pattern magnitude;

a weight memory operable to store said existing weight of each antenna element; and a beamformer in communication with said multibeam antenna and said weight memory, said beamformer operable to combine said new weight for each of said antenna elements with said plurality of signals received from said multibeam antenna to null said jamming signal.

9. The antenna nulling system as defined in claim 8 further comprising an adaptive step-sizer in communication with said sequential updater, said adaptive step-sizer operable to control how much said new weight for each antenna element calculated by said sequential updater will be changed by to control how fast a null will be formed.

10. The antenna nulling system as defined in claim 8 wherein said antenna pattern calculator includes an adapted antenna pattern calculator, a quiescent antenna pattern calculator and a feed model selector.

11. The antenna nulling system as defined in claim 10 wherein said adapted antenna pattern calculator calculates an adapted antenna pattern of said multibeam antenna at a plurality of points, said quiescent antenna pattern calculator calculates a quiescent antenna pattern of said multibeam antenna at a plurality of points, and said feed model selector controls a weight determination for each of said plurality of antenna elements.

12. The antenna nulling system as defined in claim 8 further comprising a weight controller, said weight controller operable to receive said new weight for each antenna element from said weight memory and apply said new weights to said beamformer.

13. A method for nulling a jamming signal with an antenna nulling system, said method comprising the steps of:

receiving a plurality of signals from a plurality of antenna elements in a multibeam antenna;

determining a cross-correlation of a sample signal from one of the antenna elements and a composite signal from the plurality of antenna elements;

calculating a difference in pattern magnitude of an adapted antenna pattern and a quiescent antenna pattern of the multibeam antenna;

sequentially calculating a new weight for each of the antenna elements based upon an existing weight of each antenna element, the cross-correlation and the difference in pattern magnitude; and combining the new weights for each of the antenna elements with the plurality of signals received from the multibeam antenna in a beamformer to null the jamming signal.

14. The method as defined in claim 13 further comprising the step of filtering communication signals from at least one sample signal and the composite signal.

15. The method as defined in claim 13 further comprising the step of controlling how fast a null will be formed by controlling by how much each new weight for each antenna element will be changed.

* * * * *